United States Patent Office 2,773,780
Patented Dec. 11, 1956

2,773,780

EXTERIOR SURFACE COATINGS

Donald F. Koenecke, Elizabeth, and Joseph F. Nelson, Westfield, N. J., assignors to Esso Research and Engineering Company, a corporation of Delaware No Drawing. Application June 16, 1953,
Serial No. 362,148

13 Claims. (Cl. 106—243)

This invention relates to surface coatings and more particularly it relates to exterior surface coatings in which synthetic hydrocarbon polymer drying oils are used in place of the usual vegetable drying oils.

Liquid hydrocarbon polymer oils having drying properties are known in the art. Most of these oils have not proven satisfactory in many respects as substitutes for the natural drying oils in varnishes containing them. A recent development, however, has resulted in the production of a drying oil which is equal to or superior to the natural drying oils for many uses. This superior oil is prepared by the copolymerization of butadiene and styrene in the presence of sodium as the catalyst. The oil obtained by this technique is more suitable for interior surface coatings. Many enamels and paints prepared from this drying oil have nevertheless been found prone to check or fracture badly on exterior exposure and finally to flake away from the supporting surface. Thus, this oil, although superior to other types of synthetic hydrocarbon type oils, has not been found to be satisfactory for many outdoor applications.

In accordance with the present invention it has been found that all of these hydrocarbon drying oils, and particularly the improved butadiene-styrene polymer oils, prepared with a sodium catalyst can be improved so that they can be used as exterior surface coatings by the addition thereto of about 1 to 25% based on the oil of water insoluble solid soaps of the higher organic acids and in particular the fatty acids. Suitable soaps include zinc, aluminum, magnesium, calcium, barium, or other polyvalent metal salts of palmitic, margaric, stearic, pelargonic, nondecylenic, arachidic, behenic, carnaubic, hyenic, lauric, cerotic, lacceroic, capric, montanic, psyllic, xylic, oleic, and linoleic acids; in other words any of the polyvalent metal salts of the organic acids having about 8 to 34 carbon atoms in the molecule, including the saturated acids of the fish oils, are suitable.

The polymeric drying oils which are improved in accordance with the present invention are obtained by mass or emulsion polymerization of 65 to 100 parts of butadiene and 35 to 0 parts of styrene or its homologs either by batch or continuous process.

The mass polymerization may be with sodium as a catalyst or with a peroxide catalyst. The oil prepared by the use of sodium as a catalyst is basically superior to other oils when used in films in drying properties, adhesion and flexibility. However all of these oils are improved by the present invention. When sodium is used as the catalyst the polymerization is carried out in a reaction diluent at temperatures ranging from about 25 degrees C. to 95 degrees C., preferably temperatures between 45 and 85 degrees C., when a batch process is used and at 60 degrees C. to 95 degrees C. preferably 70–95 degrees C., when a continuous process is used. As a polymerization catalyst about 1.2 to 8 parts of finely divided sodium per 100 parts of monomers is used, preferably 1.2 to 3 parts when a batch process is employed, and 2 to 5 parts when a continuous process is employed.

The above choice of monomers is quite specific as halogen-containing monomers such as chloroprene or chlorinated styrene are not suited for polymerization in the presence of sodium. Similarly, most of the higher homologues of butadiene are not desirable for the purposes of the present invention since polymers of isoprene, dimethylbutadiene and higher olefins tend to give films of poor quality. Only diolefins of the formula $$RCH=CH-CH=CH_2$$

can be used; where R is H (in butadiene) or $CH_3$ (in piperylene). The replacement of styrene by its ring alkylated homologues, such as para-methyl styrene, meta-methyl styrene, dimethyl styrene and the corresponding ethyl substituted homologues is the only variation of monomers permissible herein, however, styrene is the most practical from the economic standpoint. Alpha methyl styrene is unsuitable.

Materials used as diluents in the polymerization with sodium should be liquid and non-reactive with sodium at the polymerization temperature, that is, they should boil between 20 and 250 degrees C., although more volatile materials boiling as low as —15 degrees C., may also be used, providing that the polymerization pressure is increased correspondingly. Preferred diluents are essentially aliphatic hydrocarbons such as naphtha (boiling range about 90 to 120 degrees C.) or straight run mineral spirits such as Varsol (boiling range about 150 to 200 degrees C.) but butane, pentane, benzene, toluene, xylene, cyclohexane, butenes, pentenes or similar inert hydrocarbons are also usable, individually or in admixture with each other. In general, the aromatic solvents are not so desirable as the aliphatic ones because of the toxicity of the former. The hydrocarbon diluents are used in amounts ranging from 50 to 500, preferably 100 to 400 parts per 100 parts by weight of monomers in batch polymerizations, and 50 to 300 in continuous polymerization. The reaction can be promoted by the use of ethers as co-diluents or modifiers along with the hydrocarbon diluent described above. A particularly outstanding promoter for the batch process has been found in dioxane-1,4, whose presence in the feed promotes the reaction sufficiently to give 100% conversion at 50 degrees C., in a period of 5–10 hours. Similarly favorable results were obtained with the diethyl ether of ethylene glycol, $$H_5C_2OCH_2.CH_2OC_2H_5$$

with diethyl ether $(C_2H_5)_2O$, and also with the diethyl ether of diethylene glycol, $$H_5C_2OCH_2CH_2OCH_2.CH_2.OC_2H_5$$

In a batch process diethyl ether is usable, although the initial induction period tends to be somewhat long in some cases. The diethyl ether of ethylene glycol is not preferred, because with it a product having an undesirably high molecular weight is produced. However, diethyl ether is the preferred ether in a continuous process as the difficulty with the induction period is generally not present, it is less subject to undesirable side reactions with metallic sodium, and it is a more vigorous promoter. Other ethers useful to a still lesser extent are diethyl acetal, vinyl isobutyl ether, dihydropyrene and ethylal, all of which have a favorable effect on the reaction.

In contrast to the preferred ethers named earlier herein, the four ethers just named have a moderate retarding effect on the polymerization rate. Finally, all ethers having an O—C—O— group in a ring structure, such as dioxane-1,3, dioxolane, paraldehyde and glycol ethylene diacetal, inhibit the polymerization rate so excessively that their use is impractical.

The usual reaction time ranges from about 4–5 hours at 50 degrees C., or 8–9 hours at 30 degrees C., with a catalyst of 50 micron diameter to about 15 minutes at 95 degrees C., with a finer catalyst averaging about 10–20 microns. It is preferred to operate with a catalyst particle size of about 1 to 50, or 10 to 50 microns, such as a mixture ranging from 20 to 40 microns. Such a catalyst can be prepared by dispersing the molten alkali metal in a hydrocarbon such as Varsol by means of a homogenizer such as an Eppenbach Homo-Mixer and cooling the resulting dispersion below the melting point of sodium to prevent coalescence of the dispersed sodium particles.

The catalyst is usually fed to the reactor as a slurry of metal particles dispersed in 2 to 200 parts by weight of a hydrocarbon liquid, which may or may not be the same as the reaction diluent. Agitation of the reaction mixture during synthesis increases the efficiency of the catalyst. Conversions of 50 to 100% on monomers can be accomplished fairly readily in a batch-type operation. 100% conversion is preferred and is the usual practice. It is more difficult to reach 100% conversion in a continuous operation, and it should be observed that catalyst requirements are generally greater for continuous operation than for a batch operation having the same conversion level.

Destruction of catalyst at the end of the reaction is effectively accomplished by adding to the reaction mixture a moderate excess of anhydrous $C_1$ to $C_5$ fatty acid which is soluble in the hydrocarbon mixture, e. g. formic, acetic or pentanoic. After destruction of the catalyst the crude polymerization product containing the salts, excess acid if present is neutralized with ammonia, is finally filtered with a filter aid such as silica gel, clay, charcoal or its equivalent. Other ways of destroying the catalyst may be used, such as by adding alcohol, or inorganic acids. In another method of operation most or all of the sodium can be removed mechanically by centrifuging or filtering prior to addition of the catalyst destroying agent.

Thereafter the catalyst destroying agent can be added to remove residual sodium and sodium which has dissolved in bringing about the polymerization.

Since the resulting polymer solution is usually too dilute it is advantageous to distill off some of the volatile hydrocarbon solvent until a product containing not less than 40% non-volatile matter is obtained, the non-volatile matter being the polymeric drying oil. Where even more highly concentrated products are desired it is possible to raise the concentration of the polymeric drying oil as much as 99% or greater non-volatile matter by still more extensive distillation or stripping, the use of a stripping gas such as methane is advantageous where highly concentrated drying oils are desired. Alternatively, a low boiling diluent such as butane, a pentane, or a low boiling naphtha may be used in the synthesis step and thus simplify the eventual removal of the diluent from the polymeric product. The resulting product is, depending on the amount and type of ether used, a clear, colorless to light yellow varnish composition having at 50% N. V. M. (non-volatile matter) in Varsol, a viscosity of 0.15 to 20 poises.

Instead of carrying out the reaction in the presence of sodium, the process may be conducted in the presence of peroxide catalyst as described in U. S. Patent No. 2,586,594, issued February 19, 1952, to Erving Arundale et al. According to this process the butadiene and styrene, with or without a diluent, are charged into a pressure vessel at a pressure of 3 to 30 atmospheres and a temperature not greater than 150 degrees C., preferably between 80 and 125 degrees C. The usual reaction period for such a polymerization is between 3 and 25 or even 60 hours depending on the catalyst concentration. Suitable peroxide catalysts are t-butyl hydro-peroxide, t-butyl perbenzoate, cumene hydroperoxide and the like.

When the emulsion technique is used the butadiene and styrene are mixed in the desired ratio in about one to two parts of water containing about 0.25 to about 5% based on the water of an emulsifier such as a water soluble soap or a sulfonate type surface active agent. The polymerization is catalyzed by a trace of a per-type compound which is active under the reaction conditions such as hydrogen peroxide, benzoyl peroxide, perborates, and persulfates of ammonia and the alkali metals.

Ordinarily there is provided in the reaction mixture about 0.1 to 1.0% based on the reactants of a polymerization modifier or promoter such as aliphatic mercaptans like dodecyl mercaptan. The pH of the emulsion is usually adjusted to between about 7 and 10 when using soap type emulsifiers but the reaction may be conducted at a pH below 7 when using acid type emulsifiers such as dodecyl amine hydrochloride and the condensation products of ethylene oxide with high molecular weight aliphatic carboxylic acids, amines and the like. The polymerization is carried out at temperatures of between about 20–50 degrees C. until about 75% conversion of the unsaturated monomers to high molecular weight polymers is effected.

The viscosity obtained in the above processes can be readily increased within or about the limits obtained during the synthesis by heat bodying the oil at temperatures between 200 and 300 degrees C., e. g. 220 to 260 degrees C. as covered by Ser. No. 176,772, filed July 29, 1950, now U. S. Patent No. 2,672,425, issued to A. H. Gleason et al. on March 16, 1954. The bodying temperature can be lowered by the addition of peroxides as covered by Ser. No. 312,282, filed September 30, 1952. Further improvement can be obtained by reacting the product with 0.05 to 3% maleic anhydride, acrylonitrile, thioglycolic acid or other equivalent materials at the above temperatures.

The advantages of the invention will be better understood from a consideration of the following experimental data which are given for the sake of illustration but without intention of limiting the invention thereto.

EXAMPLE I

An oily copolymer of butadiene and styrene was prepared according to the following recipe:

| | | |
|---|---|---|
| Butadiene | parts by wt | 80 |
| Styrene | do | 20 |
| Varsol | do | 10 |
| Naphtha | do | 190 |
| Dioxane | do | 30 |
| Sodium | do | 1.5 |
| Isopropanol | do | 0.3 |
| Temperature | degrees C | 40 |

Complete conversion was obtained in ten hours. The catalyst was destroyed and removed. The product was finished to 90% non-volatile matter as described above and had an intrinsic viscosity of 0.14 (1.0 poise at 50% N. V. M.). This product was then heat bodied at 86.4% N. V. M. with 0.2% maleic anhydride to give a 7.0 poise product.

EXAMPLE II

The product obtained in accordance with Example I was used as the base for an enamel according to the following recipe:

| | | |
|---|---|---|
| $TiO_2$ (Ti-pure R 610) | g | 100 |
| Of the 7.0 poise copolymer of Example I at 50% N. V. M. | g | 200 |
| Co naphthenate | percent | 0.05 |
| Mn naphthenate | do | 0.05 |
| Pb naphthenate | do | 0.5 |

Fractions of the enamel thus prepared were mixed with 1%, 2%, 5%, and 10% of aluminum stearate based on the oily copolymer. The resulting mixtures were applied to steel panels already provided with a primer coat. The coating was allowed to air-dry and the panels were then exposed to the atmosphere in a region contaminated by refinery and other industrial gases for a period of two years. Exposure was at a 45 degree angle facing south. At the end of this time the panels were examined with the following results:

| Percent Aluminum Stearate | Age, months | Enamel Flaking |
|---|---|---|
| 0 | 21 | bad, 40-50% gone. |
| 1.0 | 23 | moderate, 15-20% gone. |
| 2.0 | 23 | None. |
| 5.0 | 23 | Do. |
| 10.0 | 23 | Do. |

The above results show that when no aluminum stearate was used the enamel had almost completely flaked off exposing the primer coat. Even 1% of the stearate was sufficient to give some protection. However, 2% or more appears to be desirable to inhibit flaking for at least 2 years of exterior exposure. The addition of larger quantities of aluminum stearate appears to have no advantage during this two year period, but they may show some superiority on longer periods of exposure.

The following formulations illustrate further applications of this invention:

*Air-drying black enamel*

| Interior or Exterior | Gallons |
|---|---|
| 30 lbs. pelletized carbon black (enamel grade) | 2 |
| 638 lbs. 50% copolymer oil [1] on polymer, bodied (from 1.0) to 4.0 poise | 90 |
| 16 lbs. Magnesium palmitate (5% based on the polymer) (8.75% pigment volume on the non-volatile) | 2 |
| 52 lbs. Varsol | 8 |
| 6.75 lbs. Lead naphthenate drier, 24% lead | ¾ |
| 2.7 lbs. Manganese naphthenate drier, 6% manganese | ⅜ |
| 2.7 lbs. Cobalt naphthenate drier, 6% cobalt | ⅜ |
| | 103½ |

[1] 20% styrene—80% butadiene—sodium catalyst modified with 0.2% maleic anhydride in accordance with U. S. Patent No. 2,652,342 of A. H. Gleason.

*Preferred instructions.*—Charge carbon black, magnesium palmitate, Varsol and 200 lbs. of copolymer oil in a ball mill half full of steel balls (⅜" to 1" diameter). Grind until fine enamel particle size exists throughout. Reduce the paste with the remaining 438 lbs. of copolymer oil and last the driers and mix thoroughly.

*Red air-drying paint, exterior*

| | Lbs. | Gals. |
|---|---|---|
| Toluidine red toner | 90 | 7.55 |
| Whiting | 60 | 2.70 |
| Diatomaceous earth | 50 | 2.50 |
| Zinc nondecylenate (28% pigment volume on the non-volatile) | 30 | 3.30 |
| Copolymer oil [1] at 75% non-volatile content in Varsol, having a viscosity of 2 poise at 50% non-volatile content in Varsol | 400 | 53.10 |
| Mineral spirits solvent (Varsol) | 216 | 33.30 |
| 24% lead naphthenate drier | 6¼ | 0.75 |
| 6% cobalt naphthenate drier | 2½ | 0.25 |
| 6% manganese naphthenate drier | 2½ | 0.25 |
| | | 103.70 |

[1] 20% styrene—80% butadiene—sodium catalyst modified with 0.1% maleic anhydride in accordance with U. S. Patent No. 2,652,342 of A. H. Gleason.

*Preferred instructions.*—Mix all the pigment and 40 gallons (301 lbs.) of copolymer oil in a grinding paste. Adjust the paste viscosity with the mineral spirits. Grind the paste on a three or five roller mill to a particle size slightly larger than enamels. Add the remaining copolymer oil and mineral spirits and finally the driers, stirring well to gain uniformity.

*Baking white enamel*

| | Lbs. | Gals. |
|---|---|---|
| Titanium dioxide | 200 | 6.1 |
| Calcium laurate (17.2% pigment volume on non-volatile) | 4.88 | 0.5 |
| Copolymer oil [1] 6 poise at 50% non-volatile content in mineral spirits | 488 | 68.3 |
| Mineral spirits (Varsol) | 180 | 27.6 |
| | | 102.5 |

[1] 20% styrene—80% butadiene—sodium catalyst modified with 1.5% maleic anhydride in accordance with U. S. Patent No. 2,652,342 of A. H. Gleason.

*Preferred instructions.*—Add titanium dioxide and calcium laurate to 20 gal. of copolymer oil, mixing to a paste. Use enough mineral spirits to adjust the paste viscosity. Grind to a fine enamel dispersion on a roller mill. Add the remaining copolymer oil and mineral spirits and mix thoroughly. Bake films 15-45 minutes at 300-325 degrees F. depending upon film thickness.

*Note.*—When a non-chalking titanium dioxide is used, the enamel can be used for exterior or interior purposes. Chalking pigments serve inside better.

*Blue baking paint, interior or exterior*

| | Lbs. | Gals. |
|---|---|---|
| Monastral blue | 32 | 2.54 |
| China clay | 64 | 2.92 |
| Talc | 32 | 1.38 |
| Lithopone | 80 | 2.20 |
| Barium pelargonate (20% pigment volume on the non-volatile) | 13.9 | 1.50 |
| | | 10.54 |
| Copolymer oil [1] (50% non-volatile content in mineral spirits), viscosity 3.0 poise | 554 | 77.4 |
| Mineral spirits | 81 | 12.50 |
| 24% lead naphthenate | 4.6 | 0.50 |
| 6% cobalt naphthenate | 1.85 | 0.25 |
| 6% manganese naphthenate | 1.85 | 0.25 |
| | | 101.44 |

[1] 20% styrene—80% butadiene—sodium copolymer—modified with 0.5% maleic anhydride in accordance with U. S. Patent No. 2,652,342 of A. H. Gleason.

*Preferred instructions.*—Charge all the pigments, 20 gallons of copolymer oil and 10 gallons of mineral spirits into a ball mill half full of steel balls. Grind 12-16 hours. Reduce the paste with the remaining copolymer oil, mineral spirits and driers. Mix thoroughly.

*Backing green enamel, interior or exterior*

| | Lbs. | Gals. |
|---|---|---|
| Medium chrome green | 80 | 2.30 |
| Aluminum palmitate (9% pigment volume on the non-volatile) | 15 | 1.60 |
| | | 3.90 |
| Copolymer oil [1], 50% non-volatile in mineral spirits, 6.0 poise viscosity | 600 | 83.90 |
| Mineral spirits | 91 | 14.0 |
| 24% lead naphthenate | 6¼ | 0.75 |
| 6% cobalt naphthenate | 2½ | 0.25 |
| 6% manganese naphthenate | 2½ | 0.25 |
| | | 103.0 |

[1] 20% styrene—80% butadiene—sodium copolymer modified with 0.2% maleic anhydride in accordance with U. S. Patent No. 2,652,342 of A. H. Gleason.

*Preferred instructions.*—Charge the pigments into a ball mill with 20 gallons of copolymer oil and 5 gallons of mineral spirits. With the mill half full of steel balls or stone pebbles grind for 20-24 hours for a fine enamel pigment dispersion. Reduce the paste with the remaining copolymer oil, mineral spirits and finally the driers. Mix thoroughly.

*Yellow baking paint, interior or exterior*

| | Lbs. | Gals. |
|---|---|---|
| Medium chrome yellow | 200 | 3.8 |
| Titanium dioxide (non-chalking type) | 50 | 1.5 |
| Whiting | 100 | 4.5 |
| Asbestine | 50 | 2.1 |
| Zinc stearate (31% pigment volume on the non-volatile) | 23 | 2.0 |
| | | 13.9 |
| Copolymer oil [1], 50% non-volatile in mineral spirits, 4.0 poise viscosity | 460 | 64.4 |
| Mineral spirits | 153 | 23.5 |
| 24% lead naphthenate drier | 2.5 | .25 |
| 6% manganese naphthenate drier | 1.0 | .12 |
| | | 102.17 |

[1] 20% styrene—80% butadiene—sodium catalyst modified with 1.5% maleic anhydride in accordance with U. S. Patent No. 2,652,342 of A. H. Gleason.

*Preferred instructions.*—Mix all the pigments with 25 gallons of copolymer oil and enough mineral spirits to make a thick but fluid paste. Grind on a 3 or 5 roll mill to a medium pigment dispersion. Reduce the dispersed paste with the remaining copolymer oil and the mineral spirits and finally the driers. Mix thoroughly. Films may be baked at 250 degrees F. for 60 minutes or 20 minutes at 300 degrees F. or corresponding times at other temperatures.

Red oxide flat paint and metal primer, air drying or baking, interior or exterior

|  | Lbs. | Gals. |
|---|---|---|
| Iron oxide red | 150 | 3.9 |
| Talc | 175 | 7.5 |
| Diatomaceous earth | 75 | 3.7 |
| Aluminum lacceroate (pigment volume 54.3% of the non-volatile) | 1 | 0.1 |
| Copolymer oil [1] (40% non-volatile), viscosity 3.0 poise at 50% N. V. M. | 250 | 36.2 |
| Mineral spirits | 331.5 | 51.0 |
| 24% lead naphthenate drier | 1.67 | 0.25 |
| 6% manganese naphthenate drier | 0.67 | 0.12 |
| 6% cobalt naphthenate drier | 0.67 | 0.13 |
|  |  | 102.9 |

[1] 20% styrene—80% butadiene—sodium catalyst—modified with 0.2% maleic anhydride in accordance with U. S. Patent No. 2,652,342 of A. H. Gleason.

*Preferred instructions.*—Charge all the pigments, copolymer oil, and 15 gallons of mineral spirits into a ball mill half full of steel balls. Grind for 24 hours. Dispersion will still be rather coarse. Reduce the paint with the remaining ingredients adding the driers last. The paint air dries hard overnight. It will bake in 15 minutes at 340–350 degrees F., 60 minutes at 240–250 degrees F. or on compromise time schedules in between.

Flat baking white paint, interior or exterior

|  | Lbs. | Gals. |
|---|---|---|
| Lithopone | 400 | 11.0 |
| Whiting | 250 | 11.2 |
| Barytes | 75 | 2.0 |
| Barium cerotate (pigment volume 50% on the non-volatile matter) | 20 | 2.0 |
|  |  | 26.2 |
| Copolymer oil [1], 40% non-volatile in mineral spirits. Viscosity 20 poises at 50% | 500 | 72.4 |
| Mineral spirits | 25 | 4.0 |
|  |  | 102.6 |

[1] 20% styrene—80% butadiene—sodium catalyst modified with 0.2% maleic anhydride in accordance with U. S. Patent No. 2,652,342 of A. H. Gleason.

*Preferred instructions.*—Mix the lithopone, whiting and barytes with 40 gallons of copolymer oil to form a grinding paste. Adjust the viscosity with mineral spirits and more copolymer oil if desirable. Grind to a uniform coarse dispersion on a roller mill. Mix the barium cerotate into the paste uniformly. Reduce with the remaining copolymer oil and mineral spirits.

Films bake in 30 minutes at 275 degrees F. or shorter times at higher temperatures.

To bake at 250 degrees F. or lower, 0.01% manganese in the form of the naphthenate or octoate soap based on the polymer must be added.

Flat green tinted paint

Mix thoroughly 8 parts by weight of the flat baking white paint with 1 part of the baking green enamel as given above.

The soap used (aluminum palmitate or barium cerotate) may be added to the original or it may be stirred into the blended or tinted paint.

White interior enamel

|  | Lbs. | Gals. |
|---|---|---|
| Titanium calcium pigment | 380 | 14.6 |
| Aluminum stearate (27.4% pigment volume on non-volatile material) | 6.2 | 0.7 |
| Copolymer oil [1], 50% non-volatile content, viscosity 7.0 poise | 620 | 86.7 |
| 24% lead octoate drier | 7.75 | 0.9 |
| 6% manganese octoate drier | 3.1 | 0.4 |
| 6% cobalt octoate drier | 3.1 | 0.4 |
|  |  | 103.7 |

[1] 20% styrene—80% butadiene—sodium catalyst modified with 0.2% maleic anhydride in accordance with U. S. Patent No. 2,652,342 of A. H. Gleason.

*Preferred instructions.*—Mix pigments and 25 gallons of copolymer oil into a grinding paste. Grind on a 3 or 5 roll mill to a fine pigment dispersion. Reduce the paste with the remaining copolymer oil and finally the driers. Mix thoroughly.

Films will air dry dust free in 4–6 hours and harden overnight. They also may be force dried below 240 degrees F.

In a few cases indoor enamels prepared with the styrene-butadiene drying oils used in this invention have shown a slight tendency to crack, especially when applied over an old enamel which is somewhat soft. The use of the metallic salts covered in this invention is also helpful to overcome this cracking. Cracking of baked films on metals such as are used in the canning industry is also reduced by the method of this invention.

The nature of the present invention having been thus fully set forth and specific examples of the same given, what is claimed as new and useful and desired to be secured by Letters Patent is:

1. A surface coating according to claim 12 in which the polymer is a polymer of 70 to 100 parts of butadiene and 30 to 0 parts of styrene.

2. A surface coating according to claim 12 in which the polymer is a sodium copolymer of 75 to 85 parts of butadiene and 25 to 15 parts of styrene.

3. A surface coating according to claim 12 in which the polymer is a peroxide copolymer of 75 to 85 parts of butadiene and 25 to 15 parts of styrene.

4. A surface coating according to claim 12 in which the polymer is an emulsion copolymer of 75 to 85 parts of butadiene and 25 to 15 parts of styrene.

5. A surface coating according to claim 12 in which the salt is aluminum stearate.

6. A surface coating according to claim 12 in which the salt is magnesium stearate.

7. A surface coating according to claim 12 in which the salt is calcium stearate.

8. A surface coating according to claim 12 in which the salt is aluminum palmitate.

9. A surface coating according to claim 12 in which the salt is magnesium palmitate.

10. A surface coating according to claim 12 in which the salt is calcium palmitate.

11. A surface coating comprising about 5–300 parts of pigment and at least 1% of a salt of a metal of the group consisting of aluminum, zinc, calcium and magnesium and an acid from the group consisting of lauric, palmitic and stearic per 100 parts of liquid base having a viscosity of about 0.15 to 20 poises in 50% solution, said liquid base consisting essentially of an oily copolymer of 75–85 parts of combined butadiene-1,3 and 25–15 parts of combined styrene prepared with sodium catalyst and 0.05 to 0.5 parts of combined maleic anhydride dissolved in an inert hydrocarbon solvent boiling between about 80–200° C.

12. A surface coating comprising an oily polymer of butadiene-1,3, 0.05–0.5 of at least one drier of the group consisting of lead naphthenate, cobalt naphthenate, manganese naphthenate, lead octoate, cobalt octoate and manganese octoate and at least 1% of a solid water insoluble salt of a metal of the group consisting of aluminum, zinc, calcium and magnesium and an acid from the group consisting of lauric, palmitic and stearic.

13. A surface coating comprising an oily polymer of butadiene-1,3 and at least 1% of a solid water insoluble salt of a metal of the group consisting of aluminum, zinc, calcium and magnesium and an acid from the group consisting of lauric, palmitic and stearic.

References Cited in the file of this patent

UNITED STATES PATENTS

| 1,878,962 | Meidert | Sept. 20, 1932 |
| 2,423,611 | Minich | July 8, 1947 |
| 2,652,342 | Gleason | Sept. 15, 1953 |
| 2,669,526 | Koenecke et al. | Feb. 16, 1954 |